United States Patent [19]

Guevara et al.

[11] 4,096,892
[45] Jun. 27, 1978

[54] RIGID COAXIAL CABLE CUTTING AND SCORING MACHINE

[75] Inventors: Humberto F. Guevara, New Haven; Michael R. Geimer, Fort Wayne, both of Ind.

[73] Assignee: International Telephone & Telegraph Corporation, Nutley, N.J.

[21] Appl. No.: 773,367

[22] Filed: Feb. 28, 1977

[51] Int. Cl.² ............................................. B21F 11/00
[52] U.S. Cl. ................................. 140/140; 29/564.4
[58] Field of Search ............... 81/9 51; 140/140; 29/564.4

[56] References Cited
U.S. PATENT DOCUMENTS

| | | | |
|---|---|---|---|
| 1,489,984 | 4/1924 | Datisman et al. | 140/140 |
| 3,505,720 | 4/1970 | Helmbrock | 81/9.51 |

*Primary Examiner*—Lowell A. Larson
*Attorney, Agent, or Firm*—John T. O'Halloran; Thomas M. Marshall

[57] ABSTRACT

The device disclosed involves an integration of a plurality of elements which automatically unreel rigid or semi-rigid coaxial cable; straightening the cable; feed a predetermined length into a cutting and scoring machine which serves to cut the end of a previously scored piece of coaxial cable and simultaneously scores the next advancing piece. Adjustable features are included to take into account the varying diameters of the coaxial cable, the length of the piece desired to be cut and scored, and the depth of the scoring. As each piece is cut from the continuous supply of coaxial cable, having been previously scored, that piece is forced, by the advancement of the next piece, into an output hopper.

4 Claims, 1 Drawing Figure

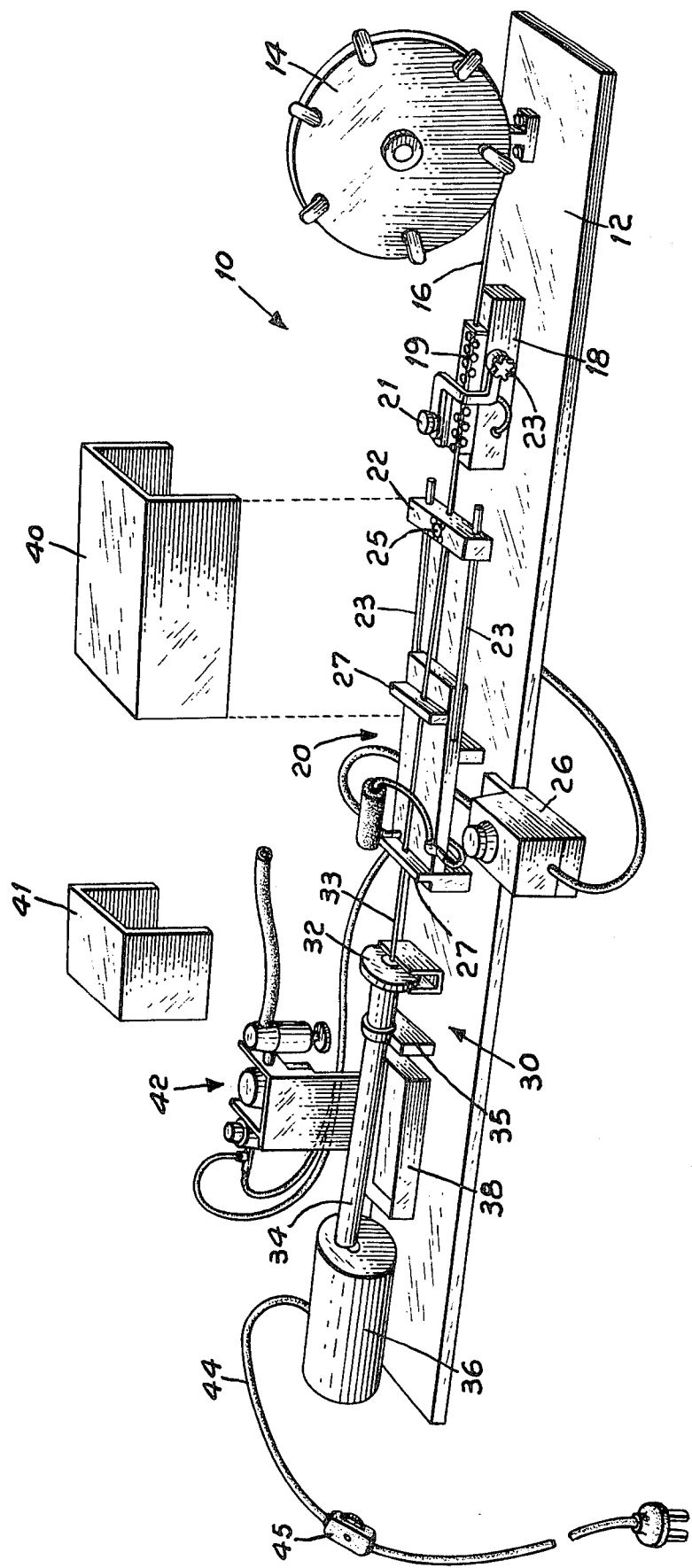

RIGID COAXIAL CABLE CUTTING AND SCORING MACHINE

BACKGROUND OF THE INVENTION

1 Field of the Invention

Semiautomatic equipment for cutting and scoring semirigid or rigid coaxial cable or tubing.

2. Prior Art

In the manufacture of precision lengths of coaxial cable required for many applications in the electrical and electronic fields, the prior art device has been a hand-fed scoring device for example, a device manufactured by Western Electronics, Model CX2 coaxial cable stripper. Shortcomings of the prior art device is that it must be hand-fed and it does not cut the cable to the desired length.

SUMMARY OF THE INVENTION

The device of this invention integrates the supply, feeding, scoring and cutting operation so as to automatically produce predetermined lengths of coaxial cable which are cut to precision lengths from a variety of gauges of semi-rigid or rigid coaxial cable and the one or both ends of the cable are scored so that the outer cover, the woven braid shielding and the insulation can be removed from one or both ends of the coaxial conductor.

BRIEF DESCRIPTION OF THE DRAWING

The drawing illustrates a perspective isometric view of the integrated device of this invention.

DESCRIPTION OF THE PREFERRED EMBODIMENT

Referring to the drawing, an integrated device of the combined equipment 10 is illustrated as being carried on a base 12 which may be conveniently mounted on a table (not shown). Starting from a supply reel 14, a supply of coaxial cable 16 wound thereon is drawn through a wire straightening device 18 which consists of a plurality of rollers 19 which, during each cycle of the machine 10, grip the coaxial cable 16 and straightens the portion which lies within its confines. Horizontal and vertical adjustment control wheels 21, 23 permit adjustments of the movement of the pneumatically operated rollers 19 so as to vary the openings through the straightener 18 to account for the varying gauges of coaxial cable 16 that may be processed.

The next major element, proceeding from right to the left as illustrated in the drawing, is the coaxial cable feeder device illustrated generally at 20. A gripping chuck 22 is carried on a pair of rods 23 which are notched at one inch intervals. While not illustrated, the chuck 22 may be positioned at one inch increments along the rods 23 and also there is a micrometer type of adjustment illustrated by the control wheel 25 which permits precise length increments of less than one inch to be made. This permits the chuck 22 to grip the wire at adjustable distances spaced from the wire straightener 18 so as to enable precise lengths of wire to be drawn from the supply 14. The chuck 22 and the rods 25 are attached to a piston like arrangement (not shown) of standard construction which is air operated and is under the control of micro-switch 26 so as to draw the predetermined length of coaxial cable from the supply 14 through the wire straightener 18 and to feed it through guides 27 so as to present its end to the cutting and scoring device indicated generally at 30.

The cutting and scoring device 30 consists of a driving motor 36 which drives a hollow shaft like extension member 34 which is supported in a pillow block 35 carried on base 12. In turn, the hollow shaft like extension member 34 drives three cutting and scoring blades (not shown) of conventional design located in the area indicated at 32. A clutch manually activated, pivots the knives into contact with the coaxial cable portion 33 at its end portion to sever a previously scored piece from the continuous length of coaxial cable 16 and may, at the same time, score the end of the next piece being fed from right to left as illustrated in the drawing.

Once the cutting and scoring operation has been performed by the cutter knives indicated at 32, the next feed cycle occurs which causes the advancing coaxial cable portion 33 to push the previously cut and scored piece into the extension 34. Slots (not shown) in the extension member 34 provide openings through which the cut and scored coaxial cable piece is dropped into a collection box 38.

Safety covers 40, 41 protect the feeding elements 20 and the cutting and scoring elements 32 during the operation of the equipment. An air regulator filter and oiler device, illustrated generally at 42, controls the supply of air to the straightening device 18 and the feeding device 20 and oils the feeding device 20 in a conventional manner. Electrical power is supplied to the equipment through input line 44 which may if desired, include an on/off switch 45.

By integrating automatic feeding and straightening equipment with the cutting and scoring device including the extension tube 34, it is possible to semiautomatically produce desired precision lengths of coaxial cable, whether of the rigid or semi-rigid type, or even small diameter tubing and thus eliminates all of the hand operations required by the previous prior art devices. By making the device adjustable as to gauge of the wire or diameter of the tubing that being operated on and by the capability of adjusting the length of the individual pieces to be made, very substantial savings of labor and time are achieved along with allowing much more accurate length adjustments to be made. In the device as illustrated in the drawing greater precision and flexibility is obtained in order to cut a wide variety of cutting and scoring rigid coaxial conductors in a variety of lengths, for example, from 0.75 inch to 8 inches long or longer.

It will be understood that the scored end of the predetermined lengths of coaxial cable can then be stripped of the outer cover, the woven braid shielding and insulation to expose the central conductor by gripping the scored end and pulling the scored layers off.

Also, while the device as illustrated is semiautomatic, in that each feeding/cutting and/or scoring cycle is manually initiated, the device could be made to operate automatically by causing the cycle to operate by a predetermined time delay built in between cycles or by a device which would initiate a new cycle each time the previous feeding and cutting/scoring cycle is completed.

While the device of this invention has been described in connection with the specific embodiment illustrated in the FIGURE, it will be appreciated by those of skill in the art that modifications may be made which do not depart from the scope of the appended claims.

We claim:

1. A device for cutting and/or scoring variable precision lengths of variable diameter tubular materials, particularly rigid or semi-rigid coaxial cable and small diameter tubing, including:

supply means for holding a continuous length of said tubular material;

adjustable diameter means for straightening said material;

feeding means for drawing an adjustably predetermined length of said material from said supply means through said straightening means and for advancing and guiding said straightened predetermined length of said material;

means for positioning said predetermined length of straightened material in means for cutting and/or scoring said material;

additional means associated with said cutting and/or scoring means for scoring the end of one predetermined length of said material, for cutting said material to said predetermined length and for scoring one end of the next length of said material;

said drawing means operating to cause a previously cut predetermined length of said material to advance beyond said cut and/or scoring means to cause said previously cut predetermined length of said material to advance;

means for activating said feeding means and said cutting and/or scoring means; and means for receiving said cut and/or scored predetermined lengths of said material.

2. A device for semi-automatically cutting and/or scoring variable precision lengths of variable diameter rigid or semi-rigid coaxial cable having at least a shielding layer, an insulating layer and a central conductor, including:

supply reel means for holding a continuous length of said coaxial cable;

adjustable diameter means for straightening said cable;

feeding means for drawing an adjustably predetermined length of said cable from said supply reel means through said straightening means and for advancing and guiding said predetermined length of said cable;

means for cutting and/or scoring said cable positioned with respect to said drawing, advancing and guiding means for cutting said cable into said predetermined lengths and for scoring said cable by cutting through the external layers of said material to an adjustable depth determined by the diameter of the central conductor of said cable;

means for activating said feeding means and said cutting and/or scoring means;

said feeding means being arranged to cause the next advancing predetermined length of material to advance the previously cut predetermined length of said material beyond said cutting and scoring means; and means for receiving said cut and scored predetermined lengths of said cable.

3. The device of claim 2 wherein said straightening means and feeding means are pneumatically operated and including means for adjusting the air pressure supplied to said straightening and feeding means.

4. The device of claim 3 wherein said activating means includes a manually activated micro-switch for controlling the supply of air under pressure to said straightening and feeding means and for operating said cutting and scoring means.

* * * * *